(12) United States Patent
Thein et al.

(10) Patent No.: US 11,363,660 B2
(45) Date of Patent: Jun. 14, 2022

(54) RADIO MODULE, METHOD TO OPERATE A RADIO MODULE, RADIO TERMINAL, METHOD TO OPERATE A RADIO TERMINAL

(71) Applicant: Robert Bosch GmbH, Stuttgart (DE)

(72) Inventors: Christoph Thein, Hildesheim (DE); Hugues Narcisse Tchouankem, Hemmingen (DE); Marie-Theres Suer, Braunschweig (DE)

(73) Assignee: Robert Bosch GmbH, Stuttgart (DE)

( * ) Notice: Subject to any disclaimer, the term of this patent is extended or adjusted under 35 U.S.C. 154(b) by 51 days.

(21) Appl. No.: 17/077,045

(22) Filed: Oct. 22, 2020

(65) Prior Publication Data
US 2021/0127444 A1    Apr. 29, 2021

(30) Foreign Application Priority Data

Oct. 23, 2019   (EP) ..................................... 19204855

(51) Int. Cl.
| | | |
|---|---|---|
| *H04W 76/16* | (2018.01) | |
| *H04W 72/04* | (2009.01) | |
| *H04W 72/12* | (2009.01) | |
| *H04W 80/02* | (2009.01) | |
| *H04B 1/403* | (2015.01) | |
| *H04W 74/08* | (2009.01) | |
| *H04W 76/15* | (2018.01) | |

(52) U.S. Cl.
CPC ....... *H04W 76/16* (2018.02); *H04W 72/0453* (2013.01); *H04W 72/1263* (2013.01); *H04W 80/02* (2013.01)

(58) Field of Classification Search
CPC ............. H04W 76/16; H04W 72/0453; H04W 72/1263; H04W 80/02; H04W 74/0808; H04W 76/15; H04B 1/406
See application file for complete search history.

(56) References Cited

U.S. PATENT DOCUMENTS

| | | | |
|---|---|---|---|
| 2009/0042555 | A1 | 2/2009 | Zhu et al. |
| 2019/0045456 | A1* | 2/2019 | Seo ......................... H04W 4/40 |
| 2019/0141725 | A1 | 5/2019 | Shahid et al. |
| 2020/0059844 | A1* | 2/2020 | Lee ......................... H04W 4/40 |
| 2020/0344832 | A1* | 10/2020 | Hu .................... H04W 72/0413 |
| 2021/0076421 | A1* | 3/2021 | Xue ....................... H04L 1/1887 |

FOREIGN PATENT DOCUMENTS

WO        2008023356 A2    2/2008

* cited by examiner

*Primary Examiner* — Harry H Kim
(74) *Attorney, Agent, or Firm* — Michael Best & Friedrich LLP

(57) ABSTRACT

A radio module (RM) for a radio terminal (T) is provided, wherein the radio module (RM) comprises: a transmitter (Tx) configured to transmit within a time period data either on a first radio channel (RCH1) of a first radio communications network according to a first operating mode or on a second radio channel (RCH2) of a second radio communications network according to a second operating mode; and a controller (CTRL) being configured to schedule a selection of one of the operating modes of the transmitter (Tx), wherein the selection comprises switching of at least one parameter of the transmitter (Tx) according to the selected operating mode.

13 Claims, 6 Drawing Sheets

RADIO MODULE, METHOD TO OPERATE A RADIO MODULE, RADIO TERMINAL, METHOD TO OPERATE A RADIO TERMINAL

BACKGROUND OF THE INVENTION

The invention is directed to a radio module, a method to operate a radio module, a radio terminal, and a method to operate a radio terminal.

To provide multi-connectivity for a radio terminal, the radio terminal has a plurality of radio modules configured to operate in a specific radio communications network.

SUMMARY OF THE INVENTION

A first aspect is directed to a radio module for a radio terminal, wherein the radio module comprises: a transmitter configured to transmit within a time period data either on a first radio channel of a first radio communications network according to a first operating mode or on a second radio channel of a second radio communications network according to a second operating mode; and a controller being configured to schedule a selection of one of the operating modes of the transmitter, wherein the selection comprises switching of at least one parameter of the transmitter according to the selected operating mode.

Advantageously, the complexity of the transmitter is reduced as only one radio channel of one radio communication system can be selected at the same time instant. Therefore, only one entity for encoding and up-sampling has to be integrated into the transmitter, which reduces the costs of the transmitter. On the other hand, the radio module provides multi-connectivity in a time-division-multiplexed manner. The benefits of using multiple paths comprise an increase in reliability.

To increase the reliability appropriate multi-connectivity methods, for example packet duplication, are deployed based on the characteristics of the communication paths, e.g. the received signal strength.

Consequently, the radio module provides an increase in reliability by enabling the potential of multi-connectivity without the need for a second radio module that will increase in the bill of materials of the final product.

An advantageous example is characterized by that the transmitter is configured to encapsulate a received first type MAC PDU into a first type PHY PDU, to map the first type PHY PDU to be transmitted on at least one first subcarrier and to subsequently up-convert to a first radio frequency higher than the at least one first subcarrier; and by that the transmitter is configured to encapsulate a received second type MAC PDU into a second type PHY PDU, to map the second type PHY PDU to be transmitted on at least one second subcarrier and to subsequently up-convert to a second radio frequency higher than the at least one second subcarrier.

Therefore, the transmitter provides an advantageous interface, which can be fed by different communication stacks. Especially, the communications stacks providing the MAC PDUs can be provided as software.

The first subcarrier and the first radio frequency represent parameters of the transmitter according to the first operating mode. The second subcarrier and the second radio frequency represent parameters of the transmitter according to the second operating mode.

An advantageous example is characterized by that the controller is configured to switch the at least one parameter according to the first or second radio channel in dependence on a pre-determined switching pattern which comprises fixed access periods for the transmitter.

By providing a pre-determined switching pattern, the transmission ratio for both radio communication networks is provided.

An advantageous example is characterized by that the controller is configured to switch the at least one parameter according to the first or second radio channel in dependence on a received end of transmission indicator, which indicates an end of a transmission via the second or first radio channel.

Advantageously, the controller gives access to the transmitter for a radio transmission if the other radio channel is not used by the radio module.

An advantageous example is characterized by that the radio module comprises: a receiver being configured to receive at least one grant, which grants the transmitter to transmit data via the first or second radio channel; and the controller being configured to switch to the first or second operating mode in dependence on the received grant Advantageously, if the first and/or second radio communications system has a granting procedure for example operated via an access point, the received grant result in the controller switching the operating mode to the radio channel for which the grant was received.

An advantageous example is characterized by that the radio module comprises: the controller being configured to operate the transmitter to transmit a first scheduling request during the first operating mode towards a scheduling entity of the first radio communications network.

Advantageously, the controller triggers the grants and adapts the scheduling of the selection of the operating modes according to the received grants. Therefore, the radio module provides a synchronization technique for the first radio communications network.

An advantageous example is characterized by that the radio module comprises: the controller being configured to operate the transmitter to transmit a second scheduling request during the second operating mode towards a scheduling entity of the second radio communications network.

Advantageously, the controller adapts the operation of the transmitter in dependence on scheduling grants originating from at least two different radio communication networks. The scheduling requests are determined by the controller in order to trigger grants that point to granted radio resources that do not interfere in time.

An advantageous example is characterized by that the radio module comprises: the controller being configured to remain with the present operating mode or switch to the first or second operating mode in dependence on a transmission priority of data.

By incorporating the transmission priority into the decision for scheduling the selection of the operating mode, other influencing parameters can be overridden. Advantageously, this guarantees transmission of certain high priority marked data.

An advantageous example is characterized by that the radio module comprises: a/the receiver being configured to sense the first radio channel as free or busy; the controller being configured to switch the transmitter from the first operating mode to the second operating mode, if the first radio channel is sensed free, and to switch the transmitter from the second operating mode to the first operating mode, if the first radio channel is sensed busy.

Therefore, a mode priority is provided, wherein the transmission via the first radio channel is preferred over the transmission via the second radio channel. Only if the first radio channel is sensed free, data is transmitted via the second radio channel.

A second aspect of the description is directed to a method to operate a radio module, wherein the method comprises: transmit within a time period data either on a first radio channel of a first radio communications network according to a first operating mode or on a second radio channel of a second radio communications network according to a second operating mode; and schedule a selection of one of the operating modes of the transmitter, wherein the selection comprises switching of at least one parameter of the transmitter according to the selected operating mode.

A third aspect is directed to a radio terminal for at least two radio communication networks, wherein the radio terminal comprises the radio module according to the first aspect.

An advantageous example is characterized by that the radio terminal comprises at least one processor, at least one memory with computer program code, and at least one antenna, the computer program code being configured to interact with the at least one processor, the at least one antenna, and the at least one radio module to cause the radio terminal to determine a/the first type MAC PDU in dependence on a first payload and provide the first type MAC PDU to the transmitter; and determine a/the second type MAC PDU in dependence on a second payload and provide the second type MAC PDU to the transmitter.

Therefore, an advantageous interface is provided allowing a plurality of software stacks for determining and providing MAC PDUs to the transmitter.

A fourth aspect is directed to a method to operate the radio terminal according to the third aspect.

DETAILED DESCRIPTION

Figure 1:
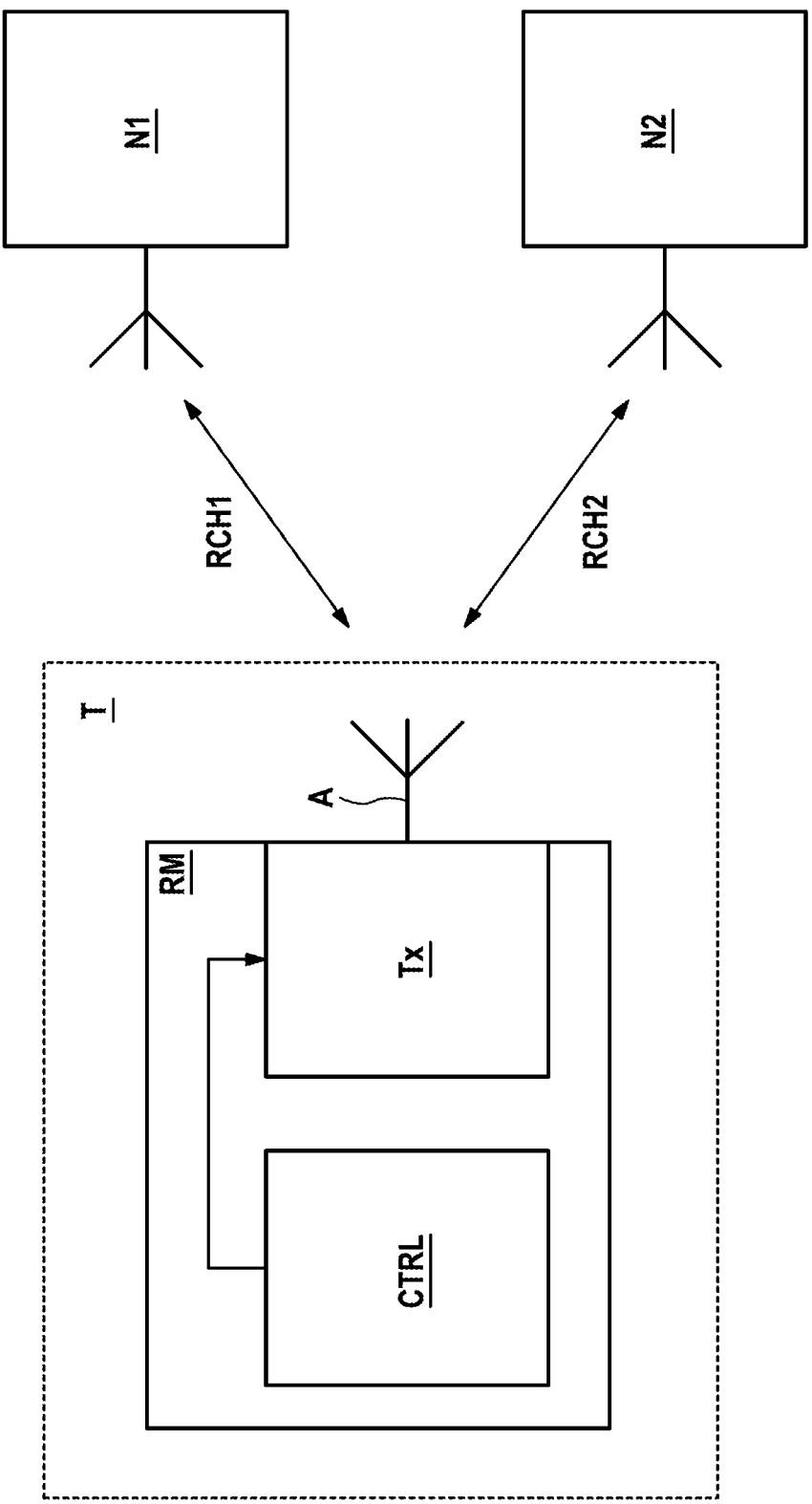
FIG. 1 schematically depicts a radio module of a radio terminal.

FIG. 1 schematically depicts a radio module RM of a radio terminal T. The radio module RM is adapted to transmit on a plurality of radio channels RCH1, RCH2 of different radio communication networks. In the example shown, a first network entity N1 communicates with the radio terminal T via the first radio channel RCH1. A second network entity N2 communicates with the radio terminal via the second radio channel RCH2. Both radio channels RCH1 and RCH2 belong to different radio communication networks and differ at least in a radio frequency, and further in at least one of the following: a modulation scheme, a coding scheme, a subcarrier frequency, and a transmission time interval.

The access to the radio channels RCH1 and RCH2 is handled in a distributed or centrally managed manner. Therefore, examples of a system comprises network entities N1, N2 with the same or different medium access schemes.

The radio module RM comprises a transmitter Tx and a controller CTRL. The transmitter Tx is configured to transmit within a time period provided data either on a first radio channel RCH1 of a first radio communications network according to a first operating mode or on a second radio channel RCH2 of a second radio communications network according to a second operating mode. The provided data is mapped to a subcarrier, subsequently up-converted to a corresponding radio signal and provided by the transmitter Tx to at least one antenna A in order to be transmitted via a radio signal of the first or second radio channel RCH1, RCH2.

The data to be transmitted is provided to the transmitter Tx. For example, MAC layer tasks and higher layer tasks are processed in software. Therefore, the data to be transmitted is handed over to the transmitter Tx at an egress section of the MAC layer.

The controller CTRL is configured to schedule a selection of one of the operating modes of the transmitter Tx, wherein the selection comprises switching of at least one parameter of the transmitter Tx according to the selected operating mode.

The at least one parameter of the transmitter Tx for operating the radio channels RCH1 and RCH2 of the respective radio communication system comprises one of the following:
  a modulation scheme,
  a coding scheme,
  a radio frequency,
  a subcarrier frequency,
  a transmission time interval.

The selection of one of the operating modes comprises a switch operation that comprises the adaption of the at least one parameter of the transmitter Tx. This selection is associated with a switching delay.

Figure 3:
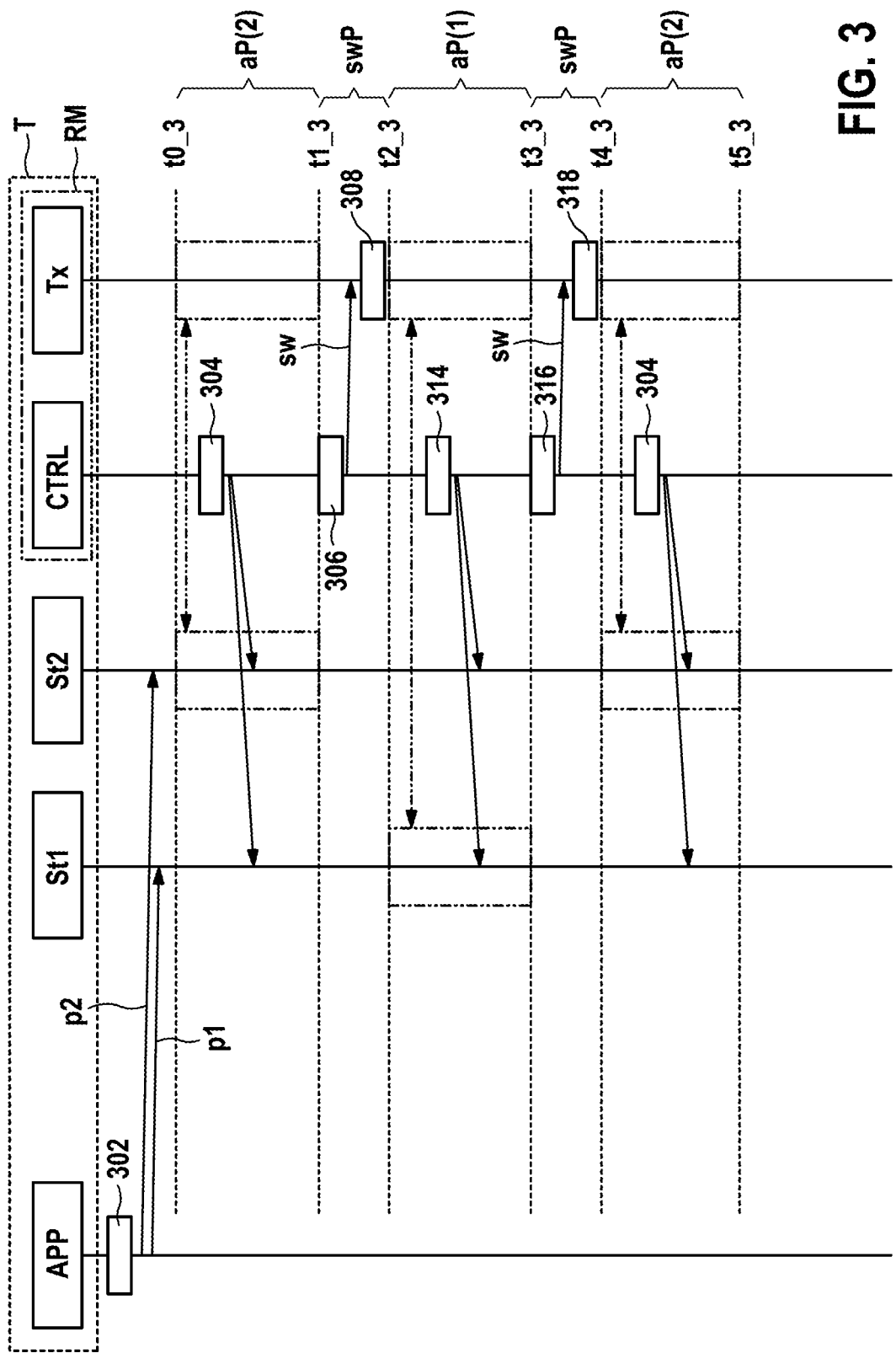
FIGS. 3 to 6 each schematically depict a sequence diagram.
Figure 4:
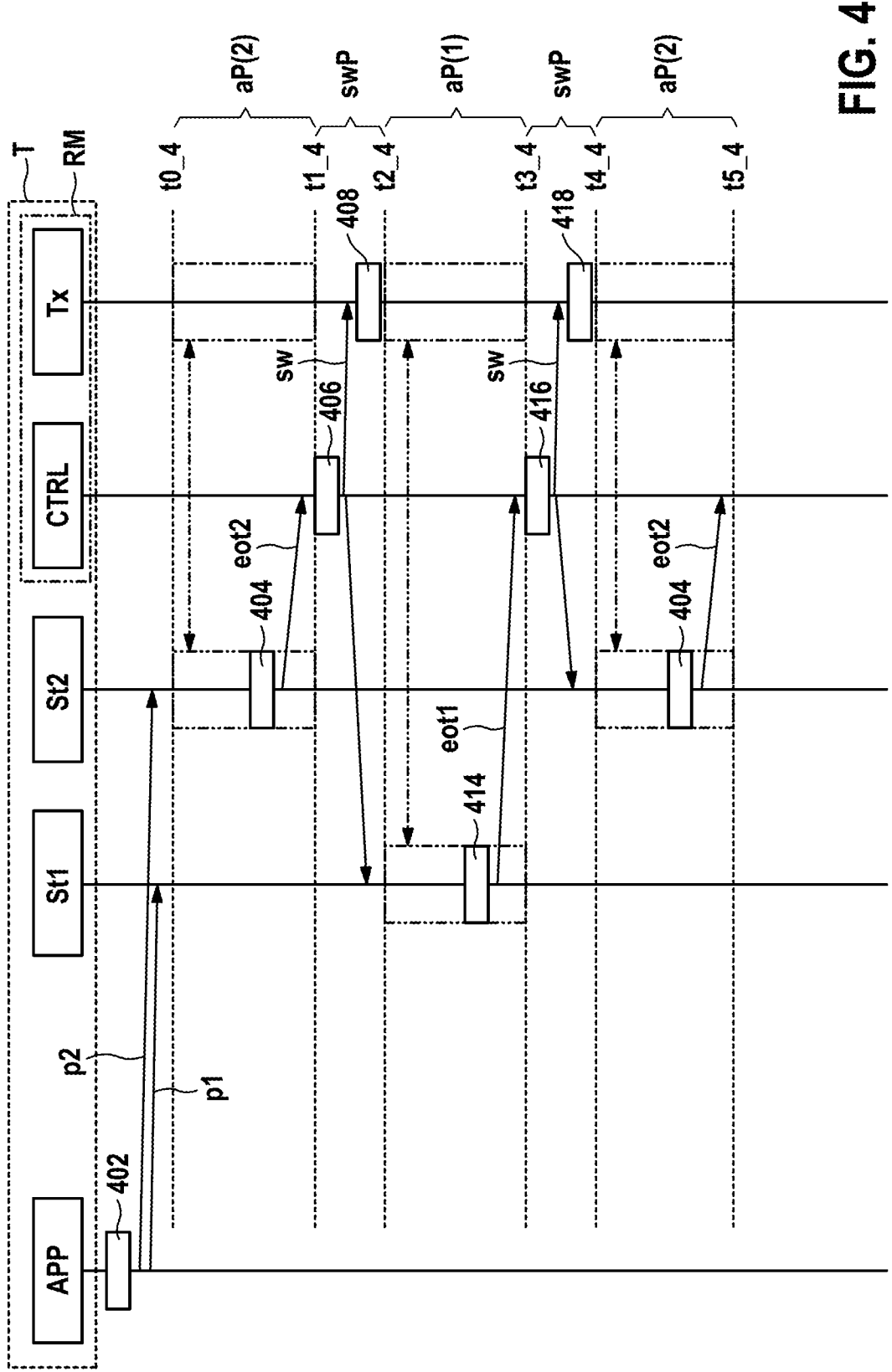
Figure 5:
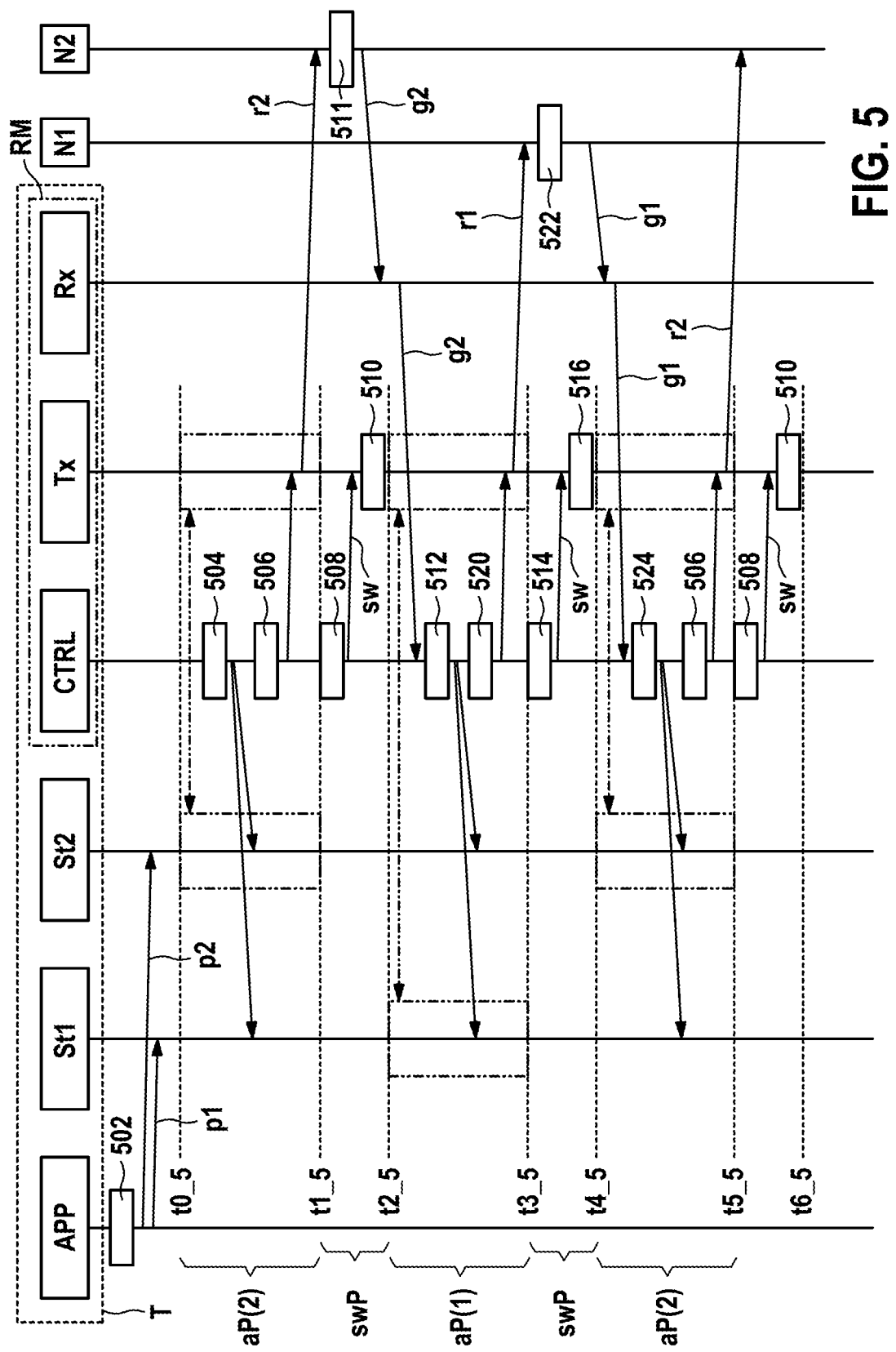
Figure 6:
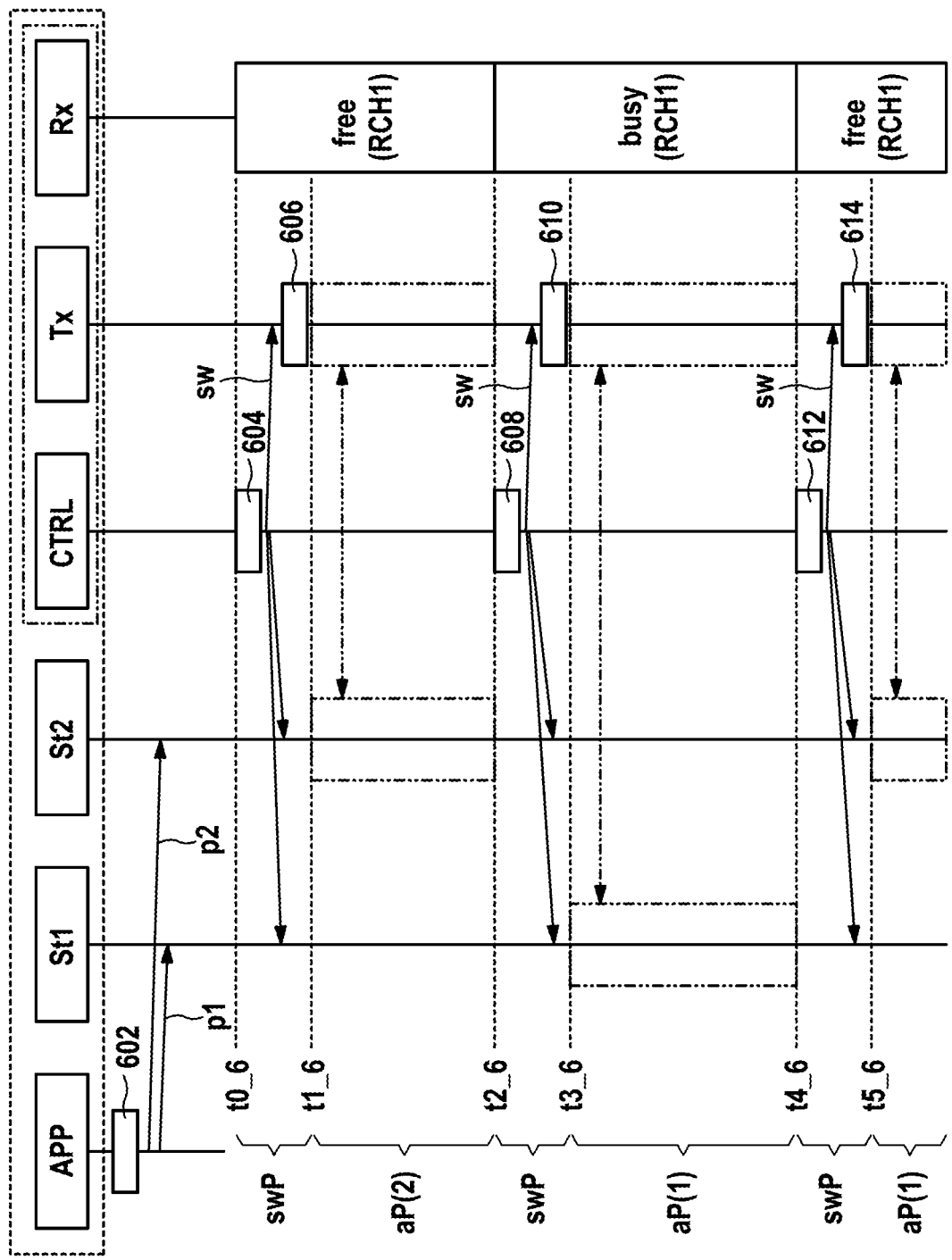

Examples for the scheduling of the selection comprise:
  a fixed timing schedule exemplified in FIG. 3,
  a flexible timing schedule based on transmission need of the associated communication stack exemplified in FIG. 4
  a flexible timing schedule based on external radio access scheduling exemplified in FIG. 5;
  a flexible timing schedule based on transmission priorities exemplified in FIG. 5;
  and
  a flexible timing schedule based on channel sensing exemplified in FIG. 6.

Of course, the provided scheduling method of the selection of the operating mode can be changed during the operation of the radio module RM. In addition, a combination of the provided methods is possible.

The resources of the transmitter Tx, i.e. the RF chain and the baseband processing, are divided in time slots and the controller CTRL schedules the access to these resources between two or more independent communication protocol stacks. The physical layer resources are configured via the at least one parameter independently for each time slot, wherein each time slot is therefore bound to one of the operating modes. The provided access scheme for the transmitter Tx increases the delay of the transmission over the multiple paths to a certain degree due to the time-multiplexed use of the resources of the transmitter Tx.

The transmitter Tx is connected to the at least one antenna A in order to transmit the radio signal. According to the provided access scheme for the radio module RM the radio signal switches the radio frequencies in a time-division manner. Therefore, the radio signals transmitted by the radio module have different frequencies and are independent of each other, i.e. for example, different source addresses are used.

By adjusting the length and the beginning of the time slots, the access scheme is optimized to various conditions in different bands. E.g. exclusive access to spectrum with a central coordination unit like in IMT-spectrum or in the 3.7-3.8 GHz band or shared access to spectrum with a distributed coordination based on CSMA-CA as in the 2.4 and 5 GHz bands. In this example, the terminal T is connected to two access points in form of the network entities N1 and N2 that are working at 5 GHz and 3.7 GHz, respectively.

Figure 2:
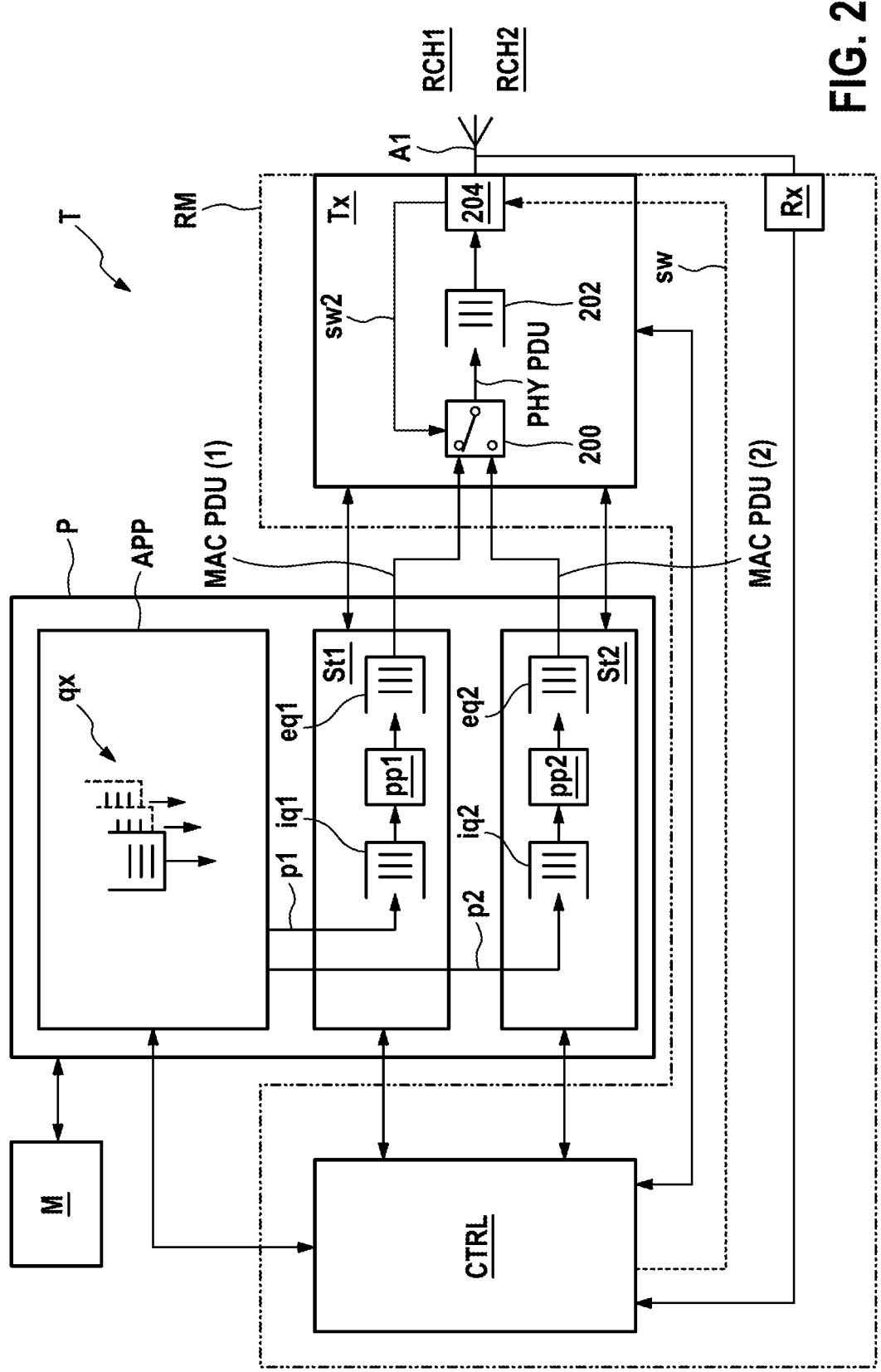
FIG. 2 schematically depicts an example of the radio terminal.

FIG. 2 schematically depicts an example of the radio terminal T. The radio terminal T comprises the radio module RM and a processor P. A memory M with a computer program code is provided. If executed on the processor P the computer program code causes the radio terminal T to execute an application APP, a first communication stack St1, and a second communication stack St2. The application APP provides a plurality of queues qx with data to be transmitted via at least one of the radio channels RCH1, RCH2.

In the shown example, the radio terminal T comprises a receiver Rx connected to the at least one antenna A. The receiver Rx is configured to sense an occupation of at least one of the radio channels RCH1 and RCH2 and/or is configured to provide data, which is transmitted via at least one of the radio channels RCH1 and RCH2 to the controller CTRL. The receiver Rx as an occupation sensing device may comprise a less complex receiver chain which does not completely decode the received data but only senses occupation.

In another example, the receiver Rx configured to receive within a time period data either on the first radio channel RCH1 of the first radio communications network according to the first operating mode or on the second radio channel RCH2 of the second radio communications network according to the second operating mode. The operating modes are switched via the switching signal sw. According to this example, both the transmitter Tx and the receiver Rx are bound to the currently set radio frequency. Advantageously, only one radio module is needed, as only the radio frequency on which the receiver RX is currently listening is used. If the respective radio channel RCH1, RCH2 is occupied, then the radio terminal T switches to the other radio channel RCH2, RCH1 and tries to transmit there. In the case of two radio networks, the receiver Rx switches back and forth between frequencies, standards, etc. to receive data and set a sleep time for the other radio network, wherein the receiver Rx does not receive. During this sleep time the other network entities temporarily store packets for the receiver Rx until the receiver Rx returns to receive on the respective frequency.

In the shown example, the controller CTRL is provided like the transmitter Tx as hardware. In an alternative example, the controller CTRL is provided as a software function that is provided as computer program code that is run on a dedicated processor or on the processor P, wherein the transmitter Tx is realized as hardware.

The first communication stack St1 receives at its ingress queue iq1 a first payload p1 from the application APP. A protocol processing unit pp1 takes the first payload p1 from the ingress queue iq1, processes the payload p1 according to the assigned at least one first communication protocol and determines a corresponding first type MAC PDU (1) that is provided in an egress queue eq1.

The transmitter Tx comprises a PHY unit 200 that is configured to encapsulate the first type MAC PDU (1) into a first type PHY PDU (1). The first type PHY PDU (1) enters a queue 202. A radio unit 204 maps the first type PHY PDU (1) to be transmitted on at least one first subcarrier and to subsequently up-convert to a first radio frequency higher than the at least one first subcarrier.

According to an example, the radio unit 204 implements at least two different radio standards in the PHY and switches between these radio standards in dependence on the switching signal sw, therefore maintaining the time multiplex between the two radio systems.

According to a further example, the radio unit 204 implements at least two similar radio standards in the PHY interface and switches between these similar radio standards in dependence on the switching signal sw, wherein the difference between the two similar radio standards relies in the radio frequencies and subcarrier frequencies.

The second communication stack St2 receives at its ingress queue iq2 a second payload p2 from the application APP. A protocol processing unit pp2 takes the second payload p2 from the ingress queue iq2, processes the payload p2 according to the assigned at least one second communication protocol and determines a corresponding second type MAC PDU (2) that is provided in an egress queue eq2.

The PHY unit 200 is configured to encapsulate the second type MAC PDU (2) into a second type PHY PDU (2). The second type PHY PDU (2) enters the queue 202. The radio unit 204 maps the second type PHY PDU (2) to be transmitted on at least one second subcarrier and subsequently up-converts to a second radio frequency higher than the at least one second subcarrier.

The controller CTRL schedules the access to the transmitter Tx for the at least two communication stacks St1 and St2. A scheduling decision of the control CTRL involves transmitting a switching signals sw to the transmitter Tx. In an example, the radio unit 204 receives the switching signal sw. After the reception of the switching signal 204, the radio unit 204 transmits the PHY PDUs residing in the queue 202 in order to empty the queue 202. Then the radio unit 204 changes the at least one parameter in order to change the operating mode of the transmitter Tx. In other words, the radio unit 204 changes its transmission mode in order to transmit the radio signal via the radio channel RCH1, RCH2 that was not selected before the switching signal sw was received. When the radio unit 204 has changed its operating mode successfully, the radio unit 204 transmits a further switch signal sw2 to the PHY unit 200 in order to switch to the selected operating mode. In other words, after receiving the further switch signal sw2 the PHY unit 200 will switch to receive MAC PDUs from the other one of the egress queues eq2, eq1 of the respective communication stack St2, St1.

Therefore, the controller CTRL controls at least the radio frequency setting of the radio unit 204 and issues the switching signal sw to change from the first radio frequency to the second radio frequency. This switching signal sw can be triggered based on a specific switching period, the end of the transmission of the communication stack that is transmitting at the current radio frequency or based on other inputs such as scheduling grants from an external central coordinator such as a base station or access point. Before issuing the switching signal sw, the currently operating communication stack St1 is informed about the upcoming switch in frequency such that it can either pause its processing, run a timer related to scheduling or medium access such as backoff procedures in CMSA/CA. In another example, the communication stack St1 or the controller CTRL monitors the priority of incoming payload p1 for the communication stack St1 and request access to the transmitter Tx.

After a switching period that is required by the RF hardware of the radio module 204 to set a new radio frequency, the activated communication stack St1, St2 continues with a paused transmission process of data until the controller CTRL signals the next switch via the switching signal sw.

In a setup where the application APP demands strict quality of service requirements, the controller CTRL will use these requirements (e.g. latency deadline) as an input and adapt the switching between the radio systems accordingly. If both radio communication networks are managed in a distributed manner and e.g. use the IEEE 802.11 DCF as input, the backoff-value of both radio communication networks is used to determine via the controller CTRL the most promising switching routine to fulfill the quality of service requirements. In situations where the first radio communications network provides a much higher backoff than the second radio communications network, the controller CTRL allocates the next time slots for transmission via the first radio communications network and let the second communication stack St2 count down its backoff value, while the first communication stack St2 uses the time slots to transmit via the transmitter Tx.

FIG. 3 schematically depicts a sequence diagram of a method to operate the terminal T.

The controller CTRL is configured to switch the at least one parameter according to the first or second radio channel RCH1, RCH2 in dependence on a pre-determined switching pattern which comprises fixed access periods aP for the transmitter Tx.

According to a step 302, the application APP determines payloads p1 and p2 and submits these to the corresponding communication stacks St1, St2. At the time t0_3 the second communication stack St2 starts accessing the transmitter Tx during the access period aP(2). During the access period aP(2), the second communication stack St2 has access to the transmitter Tx. During the access period aP(2) the controller CTRL schedules via a step 304 the selection of the operating mode OP of the transmitter Tx. Step 304 comprises that the first communication stack St1 is informed that it has access starting at time t2_3 to use the transmitter Tx. Step 304 comprises that the second communication stack St2 has to end its access to the transmitter Tx at time t1_3.

During the switching period swP the controller CTRL determines in a step 306 the switching signal sw. According to a step 308, upon receiving the switching signal sw the transmitter Tx changes its present second operating mode to the first operating mode in order to use the first radio channel instead of the second radio channel.

During the access period aP(1) the controller initiates a further switching operation in step 314. The first communication stack St1 is informed to stop access to the transmitter Tx at time t3_3. The second communication stack St2 is informed to start the access to the transmitter Tx at time t4_3.

During the following switching period swP, the controller CTRL determines in a step 316 the switching signal sw. According to a step 318, upon receiving the switching signal sw the transmitter Tx changes its present first operating mode to the second operating mode in order to use the second radio channel instead of the first radio channel in the access period aP(2).

According to this example, multi-connectivity is achieved by using only one modem in the sense of the radio module RM. The shown time slot structure comprises a fixed access period for each communication stack St1 and St2. For example, a switch takes place every 2 ms between the frequency bands of 2.4 GHz and 5 GHz. The usable time comprises the access periods aP(1) and aP(2) of the corresponding time slot subtracting the RF switching period swP.

The first communication stack 1 compromises all required layers from the MAC layer upwards and is working as usual and transmits in the frequency band 2.4 GHz. The first communication stack St1 has its own MAC address, IP address, etc. An ongoing transmission has to end before switching to the second operating mode. At the end of the access period aP(1) the current state of communication stack St1, e.g. the back-off timer, session timer, etc., is paused and continued in the next access period aP(1). During the access period aP(2) the second communication stack St2 accesses the transmitter Tx in order to transmit in the 5 GHz band based on the status of the second communication stack St2. The communication stacks St1 and St2 can be used for example by a multi-connectivity engine at the application APP to transmit duplicate data over two communication paths of different radio communications networks.

FIG. 4 schematically depicts a sequence diagram of a method to operate the terminal T. The controller CTRL is configured to switch the at least one parameter according to the first or second radio channel RCH1, RCH2 in dependence on a received end of transmission indicator eot2, eot1, which indicates an end of a transmission via the second or first radio channel RCH2, RCH1.

According to a step 402, the application APP determines payloads p1 and p2 and submits these to the corresponding communication stacks St1, St2. At the time t0_4 the second communication stack St2 starts access to the transmitter Tx during the access period aP(2). During the access period aP(2), the second communication stack St2 determines in a step 404 that the communication stack St2 will end its access to the transmitter Tx at time t1_4. During the switching period swP the controller CTRL schedules via a step 406 the selection of the first operating mode of the transmitter Tx. Step 406 comprises that the first communication stack St1 is informed that it has access to the transmitter Tx starting at time t2_4 to use the transmitter Tx. Step 406 comprises that the transmitter Tx is informed via the switching signal sw to switch the operation mode of the transmitter Tx in a step 408 to the first operating mode.

At a time t2_4 the first communication stack St1 starts access to the transmitter Tx during the access period aP(1). During the access period aP(1), the first communication stack St1 determines in a step 414 that the communication stack St1 will end its access to the transmitter Tx at time t3_4. During the switching period swP the controller CTRL schedules via a step 416 the selection of the second operating mode of the transmitter Tx. Step 416 comprises that the second communication stack St2 is informed that it has access to the transmitter Tx starting at time t4_4 to use the transmitter Tx. Step 416 comprises that the transmitter Tx is informed via the switching signal sw to switch the operation mode of the transmitter Tx in a step 418 to the second operating mode.

FIG. 5 schematically depicts a sequence diagram of a method to operate the terminal T.

The receiver Rx is configured to receive at least one grant g1, g2 that grants the transmitter Tx to transmit data via the first or second radio channel RCH1, RCH1. The controller CTRL is configured to switch to the first or second operating mode in dependence on the received grant g1, g2.

The controller CTRL is configured to operate the transmitter Tx to transmit a first scheduling request r1 during the first operating mode towards a scheduling entity N1 of the first radio communications network.

The controller CTRL is configured to operate the transmitter Tx to transmit a second scheduling request r2 during the second operating mode towards a scheduling entity N2 of the second radio communications network.

According to a step 502, the application APP determines payloads p1 and p2 and submits these to the corresponding communication stacks St1, St2. At the time t0_5 the second communication stack St2 starts accessing the transmitter Tx during the access period aP(2). During the access period aP(2), the second communication stack St2 has access to the transmitter Tx. In an example not shown, the second communication stack St2 can initiate a transmission of the second payload p2 to the network node N2 of the second radio communication network. The controller CTRL schedules in step 504 that the second communication stack St2 ends its access of the transmitter at time t1_5 and that the first communication stack St1 starts accessing the transmitter Tx at time t2_5.

During the subsequent switching period swP, the controller CTRL initiates in step 508 a switch of the second operating mode of the transmitter Tx to the first operating mode. In step 510, the transmitter switches to the first operating mode in dependence on the received switching signal sw.

During the access period aP(2) in step 506 the controller CTRL or the second communication stack St2 (not shown) causes the transmitter Tx to transmit a scheduling request r2 towards the network node N2 that is configured as a scheduling entity for the second radio communication network. The network node N2 determines in step 511 the grant g2, which is received by the receiver Rx of the radio module RM. The receiver Rx passes the grant g2 to the controller CTRL. In step 512, the controller CTRL informs in dependence on the grant g2 the first communication stack St1 that it has to end access to the transmitter until time t3_5.

In the step 512, the controller CTRL informs in dependence on the grant g2 that the second communication stack St2 will gain access to the transmitter Tx beginning with time t4_5. The grant g2 indicates a radio resources of the second radio channel in the access period aP(2) between t4_5 and t5_5.

The controller CRTL starts its switching procedure at time t3_5. In step 514, the controller CRTL determines the switching signal sw so that the transmitter Tx changes its operating mode to the second operating mode in step 516. According to the received grant g2, the second communication stack St2 is able to transmit payload data p2 via the granted radio resources of the second radio channel.

During the access period aP(2) between t2_5 and t3_5 the controller CTRL or (not shown) the first communication stack St1 initiates in step 520 a grant request r1 to be sent via the transmitter Tx towards the network node N1 that acts as a scheduling entity for the first radio communication network. The network node N1 schedules the radio resources of the first radio channel and determines in step 522 a grant g1 that is received by the receiver Rx and handed over to the controller CTRL.

According to step 524, the controller CTRL informs the first communication stack St1 that it can access the transmitter Tx starting with time t6_5, and informs the second communication stack St2 that its access to the transmitter Tx will end at time t5_5. The following steps 508 and 510 depend on the determined time t5_5.

The provided method aligns the switching periods swP and the access periods aP(1) and aP(2) based on the scheduling decisions from the centrally coordinated communication in the first and second radio communication network. In this case, both radio communication networks are centrally coordinated. For example, in case that both system are scheduled semi-persistent the controller CTRL will influence the network nodes N1 and N2 to schedule the respective radio resources such that the scheduled radio resources for both radio communication networks are scheduled non-overlapping in time. By doing so the switching period swP and the access periods aP(1) and aP (2) are adapted to the corresponding resource allocation and no radio resource according to the grants g1, g2 is missed by the radio terminal T.

A further example of scheduling of the switching is given in the following. In a system where IEEE 802.11 in HCCA mode is used, the Contention Free Period (CFP), during which the HCCA controller CTRL manages the channel access, and the Contention Period (CP), during which the channel is used by other nodes in DCF mode, switch periodically. HCCA is a centrally coordinated communication scheme in which a Hybrid Coordinator control the access to the medium. If both radio communication networks use the HCCA mode, the controller CTRL will influence the network nodes N1 and N2 such that the CFP periods of both radio systems do not overlap in time and schedule the switching between the two radio communication networks accordingly.

If only one radio communication network uses the HCCA and the other radio communication network is using a distributed scheme, e.g., the 802.11 DCF, the controller CTRL will schedule the switching according to the CFP periods of the HCCA, radio communication network and let the other communication stack transmit in the remaining time slot with best effort.

According to a further example not shown in its entirety, the controller CTRL is configured to remain with the present operating mode or switch to the first or second operating mode in dependence on a transmission priority of data. The controller CTRL compares the transmission priorities of the MAC PDUs in the egress queues of the different communication stacks St1 and St2. Therefore, if the controller CTRL also considers a higher transmission priority for MAC PDUs of the first communication stack St1 in step 512, the controller CTRL will ignore in the step 512 the grant g2 and remain with the first operating mode of the transmitter Tx as active.

Furthermore, in a mixed setup, where the medium access of the first radio communication network is coordinated centrally and the medium access of the second radio communication network is managed in a distributed manner, the switching times can be adjusted such that they give priority to the resources of the first radio communication network. By doing so, at least the path over the first radio communications network can predictably transmit packets whereas the second radio communications network is only transmitting with best effort. However, the access period for the first communication stack St1 is kept to a minimum, which leaves more time for the second communication stack St2 to access the channel.

FIG. 6 schematically depicts a sequence diagram. The receiver Rx is configured to sense the first radio channel as free or busy.

The controller CTRL is configured to switch the transmitter Tx from the first operating mode to the second operating mode, if the first radio channel RCH1 is sensed free, and to switch the transmitter Tx from the second operating mode to the first operating mode, if the first radio channel RCH1 is sensed busy.

According to a step 602, the application APP determines payloads p1 and p2 and submits these to the corresponding communication stacks St1, St2. At the time t0_6 the controller CTRL informs in step 604 the second communication stack St2 that it has access to the transmitter Tx beginning with time t1_6. In dependence on the received switching signal sw the transmitter Tx changes in step 606 its operating state to the second operating state.

The receiver Rx sense the first radio channel RCH1 as busy at time t2_6 and starts in step 608 to change the operating state of the transmitter Tx to the first operating state. The transmitter Tx changes its operating state to the first operating state in step 610. The second communication stack St2 is informed to stop access to the transmitter Tx. The first communication stack St2 is informed that access to the transmitter Tx is provided starting with time t3_6.

As soon as the receiver Rx senses the first channel RCH1 as free, the controller CTRL initiates in step 612 a change of the operating state of the transmitter Tx to the second operating state in step 614.

The second communication stack St2 starts accessing the transmitter Tx during the access period aP(2). During the access period aP(2), the second communication stack St2 has access to the transmitter Tx. In an example not shown, the second communication stack St2 can initiate a transmission of the second payload p2 to the network node N2 of the second radio communication network. The controller CTRL schedules in step 504 that the second communication stack St2 ends its access of the transmitter at time t1_5 and that the first communication stack St1 starts accessing the transmitter Tx at time t2_5.

According to this exemplary setup, transmissions take place according to a non-coordinated scheme in which radio terminals T in the 3.7 GHz act as primary users and those radio terminals T in the Wi-Fi band as secondary users. Therefore, Wi-Fi users can start to transmit only if there is no 3.7 GHz transmission. That means, the controller CTRL monitors the at least the first radio channel RCH1 in order to detect the existence of a potential transmission. As long as the transmission in 3.7 GHz/the first radio channel RCH1 is paused, the Wi-Fi users would take this opportunity to transmit an unknown quantity of data (burst) depending of the time allocated and have to vacate as soon as 3.7 GHz transmissions follow, which means that the first radio channel RCH1 is sensed busy. In other words, Wi-Fi users take opportunity of idle periods for transmission of data on the second radio channel RCH2. This setup takes into account conventional Wi-Fi users using CSMA/CA as well as users in a tuned Wi-Fi system without a channel access mechanism.

The invention claimed is:

1. A radio module (RM) for a radio terminal (T), the radio module (RM) comprising:
   a transmitter (Tx) is configured to
   encapsulate a received first type MAC PDU into a first type PHY PDU, to map the first type PHY PDU to be transmitted on at least one first subcarrier and to subsequently up-convert to a first radio frequency higher than the at least one first subcarrier and
   transmit data within a time period either on a first radio channel (RCH1) of a first radio communications network according to a first operating mode or on a second radio channel (RCH2) of a second radio communications network according to a second operating mode; and
   a controller (CTRL) configured to schedule a selection of one of the operating modes of the transmitter (Tx), wherein the selection comprises switching of at least one parameter of the transmitter (Tx) according to the selected operating mode.

2. The radio module (RM) according to claim 1,
   wherein the transmitter (Tx) is configured to encapsulate a received second type MAC PDU into a second type PHY PDU, to map the second type PHY PDU to be transmitted on at least one second subcarrier and to subsequently up-convert to a second radio frequency higher than the at least one second subcarrier.

3. The radio module (RM) according to claim 1, wherein the controller (CTRL) is configured to switch the at least one parameter according to the first or second radio channel (RCH1; RCH2) in dependence on a pre-determined switching pattern which comprises fixed access periods (ap) for the transmitter (Tx).

4. The radio module (RM) according to claim 1,
   wherein the controller (CTRL) is configured to switch the at least one parameter according to the first or second radio channel (RCH1; RCH2) in dependence on a received end of transmission indicator (eot2; eot1), which indicates an end of a transmission via the second or first radio channel (RCH2; RCH1).

5. The radio module (RM) according to claim 1, wherein the radio module (RM) comprises: a receiver (Rx) configured to receive at least one grant (g1; g2) to transmit data via the first or second radio channel (RCH1; RCH2); and wherein the controller (CTRL) is configured to switch to the first or second operating mode in dependence on the received grant (g1; g2).

6. The radio module (RM) according to claim 5, wherein the controller (CTRL) is configured to operate the transmitter (Tx) to transmit a first scheduling request (r1) during the first operating mode towards a scheduling entity (N1) of the first radio communications network.

7. The radio module (RM) according to claim 5, wherein the controller (CTRL) is configured to operate the transmitter (Tx) to transmit a second scheduling request (r2) during the second operating mode towards a scheduling entity (N2) of the second radio communications network.

8. The radio module (RM) according to claim 1, wherein the controller (CTRL) is configured to remain with the present operating mode or switch to the first or second operating mode in dependence on a transmission priority (p1; p2) of data.

9. The radio module (RM) according to claim 1, wherein the radio module (RM) comprises
   a receiver (Rx) configured to sense the first or second radio channel (RCH1; RCH2) as free or busy;
   and wherein the controller (CTRL) configured to switch the transmitter (Tx) from the first operating mode to the second operating mode, if the first radio channel (RCH1) is sensed busy, and to switch the transmitter (Tx) from the second operating mode to the first operating mode, if the second radio channel (RCH2) is sensed busy.

10. The radio module (RM) according to claim 1, wherein the radio module (RM) comprises:
    a receiver (Rx) configured to receive data within a time period either on the first radio channel (RCH1) of the first radio communications network according to the first operating mode or on the second radio channel (RCH2) of the second radio communications network according to the second operating mode.

11. A method to operate a radio module (RM), the method comprising:
    encapsulating a received first type MAC PDU into a first type PHY PDU, to map the first type PHY PDU to be transmitted on at least one first subcarrier and to subsequently up-convert to a first radio frequency higher than the at least one first subcarrier;

transmitting data within a time period either on a first radio channel (RCH1) of a first radio communications network according to a first operating mode or on a second radio channel (RCH2) of a second radio communications network according to a second operating mode; and scheduling a selection of one of the operating modes of a transmitter (Tx), wherein the selection comprises switching of at least one parameter of the transmitter (Tx) according to the selected operating mode.

12. A radio terminal (T) for at least two radio communication networks, wherein the radio terminal (T) comprises a transmitter (Tx) configured to encapsulate a received first type MAC PDU into a first type PHY PDU, to map the first type PHY PDU to be transmitted on at least one first subcarrier and to subsequently up-convert to a first radio frequency higher than the at least one first subcarrier and transmit data within a time period either on a first radio channel (RCH1) of a first radio communications network according to a first operating mode or on a second radio channel (RCH2) of a second radio communications network according to a second operating mode; and a controller (CTRL) configured to schedule a selection of one of the operating modes of the transmitter (Tx), wherein the selection comprises switching of at least one parameter of the transmitter (Tx) according to the selected operating mode.

13. The radio terminal (T) according to claim 12, wherein the radio terminal (T) comprises at least one processor, at least one memory with computer program code, and at least one antenna, the computer program code being configured to interact with the at least one processor, the at least one antenna, and the at least one radio module (RM) to cause the radio terminal (T) to determine a first type MAC PDU in dependence on a first payload and provide the first type MAC PDU to the transmitter (Tx); and determine a second type MAC PDU in dependence on a second payload and provide the second type MAC PDU to the transmitter (Tx).

\* \* \* \* \*